Feb. 28, 1961 R. L. LATHAM Re. 24,941

ROCKER ARM

Original Filed April 14, 1958 3 Sheets-Sheet 1

INVENTOR.
RAYMOND L. LATHAM.
BY
Harness & Harris
ATTORNEYS.

ROCKER ARM

Original Filed April 14, 1958 3 Sheets-Sheet 2

INVENTOR.
RAYMOND L. LATHAM.
BY
Harness & Harness
ATTORNEYS.

ROCKER ARM

Original Filed April 14, 1958 3 Sheets-Sheet 3

INVENTOR.
RAYMOND L. LATHAM.
BY
Harness & Harris
ATTORNEYS.

United States Patent Office

Re. 24,941
Reissued Feb. 28, 1961

24,941

ROCKER ARM

Raymond L. Latham, Detroit, Mich., assignor to Chrysler Corporation, Highland Park, Mich., a corporation of Delaware Original No. 2,905,161, dated Sept. 22, 1959, Ser. No. 728,399, Apr. 14, 1958. Application for reissue Feb. 9, 1960, Ser. No. 7,737

25 Claims. (Cl. 123—90)

Matter enclosed in heavy brackets [ ] appears in the original patent but forms no part of this reissue specification; matter printed in italics indicates the additions made by reissue.

This invention relates to improvements in a rocker arm especially of the type used to operate the gas inlet and exhaust valves of an internal combustion engine.

Numerous stamped, cast, and forged rocker arms well known to the art have been employed heretofore with varying degrees of success to operate the valves of an internal combustion engine. A particular type of rocker arm construction comprises a stamped or forged body having a central anti-friction bushing adapted to be mounted on a rocker supporting shaft and also having oppositely directed projections, one being engageable with a push rod for operation thereby, and the other being engageable with the stem of a valve to operate the latter. In such construction the bushing is pressed into an opening within the body and is lubricated by suitable means. Although such rocker arms have performed with reasonable success, the costs of prefabricating the central bushing, of assembling the same into the body of the rocker arm, and of providing suitable lubricating means for the bushing have raised serious objections to the use of such rocker arms.

It is accordingly an important object of the present invention to provide a new and improved simplified unitary sheet metal rocker arm and lubricating means therefor which obviate the necessity of a separate pressed fit bushing and which can be readily fabricated by stamping and punching operations at a fraction of the cost of conventional rocker arm assemblies presently known to the art.

Another object is to provide a rocker arm adapted to be pivotally mounted on a cylindrical rocker supporting shaft, the rocker arm comprising a cylindrical-shaped bottom strap adapted to conform to the contour of the under side of the shaft and to engage the latter closely in bearing relationship, the strap terminating upwardly at opposite ends in generally radial or lateral push rod and valve stem engaging projections having axially spaced vertical sides which are crimped or coined adjacent their junctures with the strap to provide axially spaced upward cylindrical extensions of the strap closely engageable with the shaft in bearing relation and cooperating with said projections to form pockets for receiving lubricating oil adjacent the sides of the shaft.

Another object is to provide such a structure wherein lubricating oil is fed under pressure to the rocker arm strap via a lubricating duct extending axially within the shaft and opening at a lubricating port which extends radially through the shaft to the juxtaposed inner surface of the strap.

Another object is to provide such a structure wherein the lubricating oil flows under pressure circumferentially between the strap and the shaft to the aforesaid pockets and thereafter flows freely axially from the rocker arm between the latter and shaft at locations above said upward extensions of the straps, thereby to assure a continuous supply of fresh lubricating oil at the bearing surfaces and to flush out products of wear and abrasion so as to achieve optimum serviceability with a minimum of structural complexity and expense.

Other objects are to provide a rocker arm structure of the foregoing character wherein the aforesaid push rod engaging projection of the rocker arm inclines upwardly from the shaft. The adjacent axially spaced upward extensions of the strap cooperate with the latter projection to provide an oil-receiving pocket of appreciable size. The latter projection is provided with a dimple or socket formed in its under side to receive the rounded upper end of a cam actuated push rod. An oil passage port extends from the latter pocket to the under side of said push rod engaging projection at said socket, whereby lubricating oil is supplied to the latter by the combined actions of gravity flow, capillary action, and mechanical agitation resulting from rapid oscillation of the rocker arm during operation.

Other objects of the invention will appear in the following description and appended claims, reference being had to the accompanying drawings forming a part of this specification wherein like reference characters designate corresponding parts in the several views.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
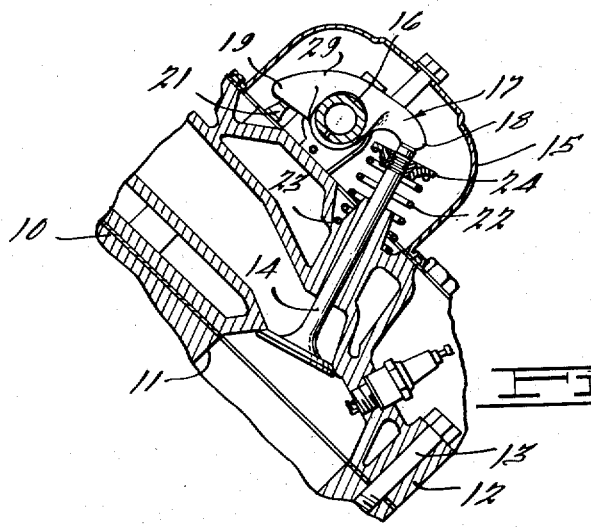
Figure 1 is a fragmentary transverse vertical sectional view through the engine cylinder of an internal combustion engine, showing a rocker arm embodying the present invention.

Referring to Figure 1, an internal combustion engine is shown comprising an engine block 10 having a number of cylinders, such as cylinder 11, enclosed by a cylinder head 12 secured to the block 10 by bolts 13. The head 12 is provided with suitable gas inlet and exhaust ports for each cylinder, which ports are closed by stem valves, such as valve 14. Suitably mounted on the head 12 is an oil splash pan 15 containing a hollow rocker supporting shaft 16 extending longitudinally of the head 12 and mounted thereon. In accordance with customary practice, a number of cylinders 11 may be arranged in a row, each being associated with an inlet valve and an exhaust valve, which valves are also arranged in a row or bank for operation by a corresponding plurality of rocker arms 17 pivotally mounted on shaft 16.

Figure 2:
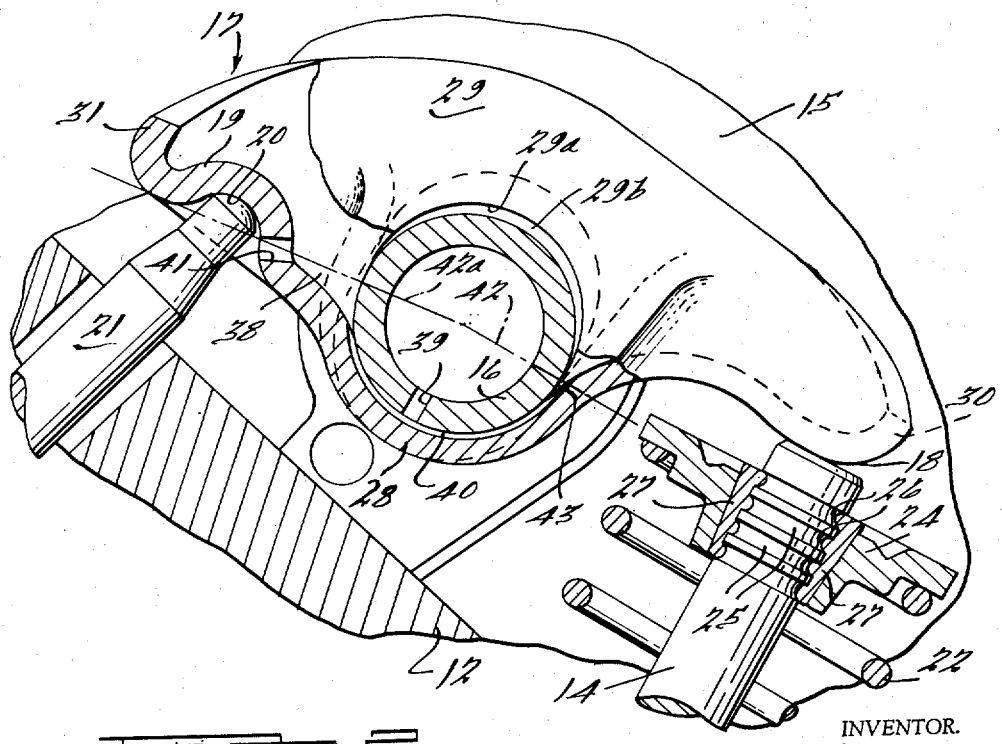
Figure 2 is an enlarged fragmentary view similar to Figure 1, with portions of the rocker arm broken away to show details of construction.

The several rocker arms 17 are substantially identical, each having oppositely directed valve engaging and push rod engaging projections 18 and 19 extending generally radially or laterally from shaft 16, Figure 2. The under side of extension 18 is rounded adjacent its extremity and overlies the end of the stem of valve 14 to operate the latter. The under side of projection 20 is formed with an upwardly domed socket or dimple 20 adapted to receive the correspondingly rounded upper end of a cam-actuated push rod 21, whereby valve 14 is opened and closed in synchronism with operation of the engine.

Figure 4:
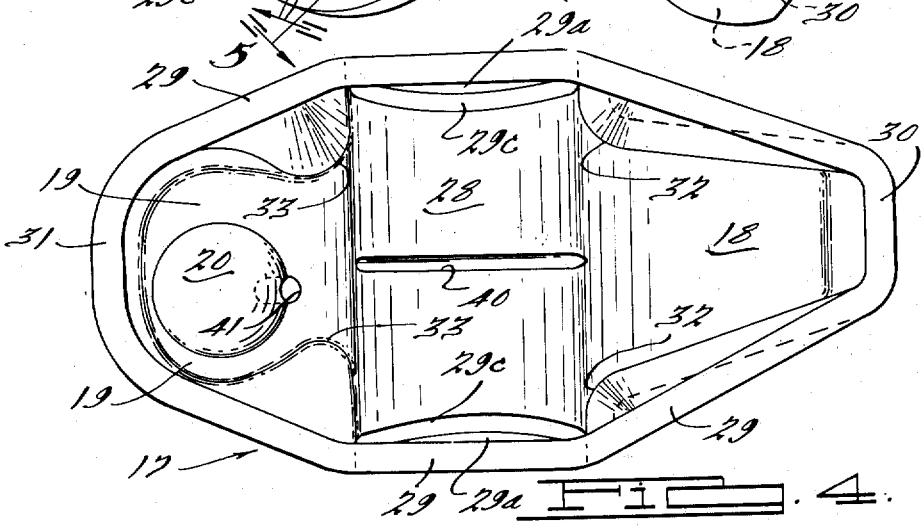
Figure 4 is an elevational view of the rocker arm of Figure 3, looking into the open upper and thereof.

As illustrated in Figure 4, the dimple or socket 20 is offset toward one axial side of the transverse mid plane of the rocker arm, whereas the extension 18 is biased slightly to the opposite side of said mid plane. Thus the rocker arm illustrated comprises one of a pair associated with the engine inlet and exhaust valves respectively. The other rocker arm of the pair may be formed substantially as shown except that the socket 20 and projection 18 will be offset oppositely from the socket and projection shown. Such a construction renders feasible the use of paired rocker arms of broader axial width, and accordingly of broader bearing surface as described below, without altering the customary axial spacing between the exhaust and inlet valves associated with each cylinder.

Each valve 14 is maintained in its upward or port closing position by means of coil spring 22 arranged coaxially around the stem of the valve under compression between an annular seat 23 of the head 12 and an annular upper spring retainer 24. The latter is secured to the upper end of the stem of valve 14 by means of a number of annular grooves 25 formed therein into which fit the mating projections 26 of two semi-annular dogs 27. The outer surfaces of the dogs 27 are conically shaped and enlarge upwardly to mate with the upwardly enlarging conical inner surface of annular retainer 24. By virtue of the foregoing structure, the spring retainer 24 is readily assembled over the upper end of spring 22 and then forced downwardly below the grooves 25. Thereafter the dogs 27 are assembled in position and the retainer 24 is released to return to the position shown in Figure 2 by the action of spring 22, thereby to hold the dogs 27 positively in position. The structure is readily disassembled to enable valve repair or replacement.

Referring in more particularity to Figures 2–8, details of the rocker arm 17 are illustrated. Preferably the arm 17 comprises a unitary dished sheet metal body susceptible of economical fabrication by stamping and punching operations. The body is provided with a bottom strap 28 of cylindrical contour coaxial with shaft 16 and adapted to serve as the bearing surface for the rocker arm at the under side of the shaft 16. The opposite upper ends of the strap 28 merge laterally into the bottom portions of the declining projection 18 and the inclining projection 19 respectively. Thus as illustrated in Figure 2, approximately only the lower third of the shaft 16 engages the main portion of the strap 28 in bearing relation.

Extending upwardly from the sides of the projections 18 and 19 are side walls 29 which bridge the space above the strap 28 at the central broadest portion of the body of the rocker arm 17. From the central portion of the rocker arm 17, the sides 29 converge toward opposite ends of the projections 18 and 19 and are joined by end walls 30 and 31 respectively.

In order to provide for axial passage of the shaft 16, generally coaxial openings 29a are formed in opposite side walls 29, preferably by lancing operations performed through the open top of the dished rocker arm 17. The openings 29a are somewhat oval in shape and provide a clearance 29b between the upper regions of the shaft 16 and juxtaposed portions of the side walls 29. The lower outer edges of the openings 29a are chamfered at 29c, whereas the upper inner edges of the openings 29a are chamfered at 29d.

Figure 5:
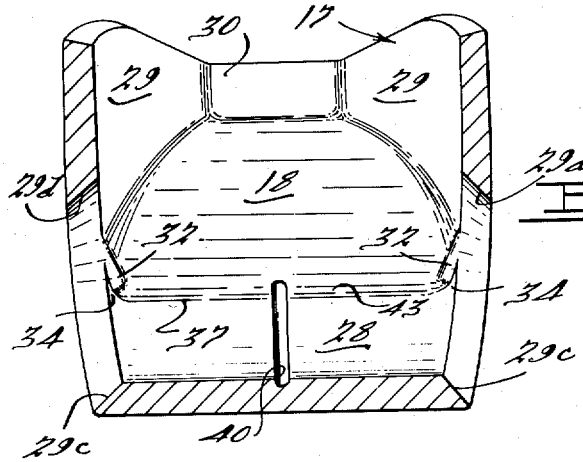
Figure 5 is a sectional view taken in the direction of the arrows along the line 5—5 of Figure 3.
Figure 6:
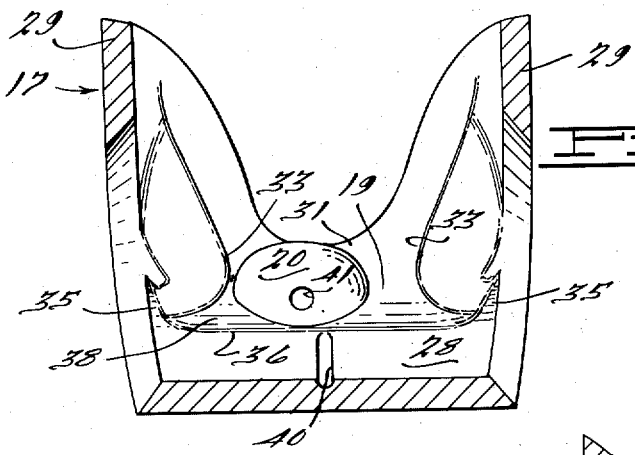
Figure 6 is a sectional view taken in the direction of the arrows substantially along the line 6—6 of Figure 3.
Figure 7:
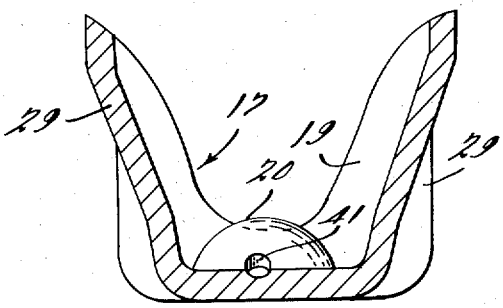
Figure 7 is a sectional view taken in the direction of the arrows along the line 7—7 of Figure 3.
Figure 8:
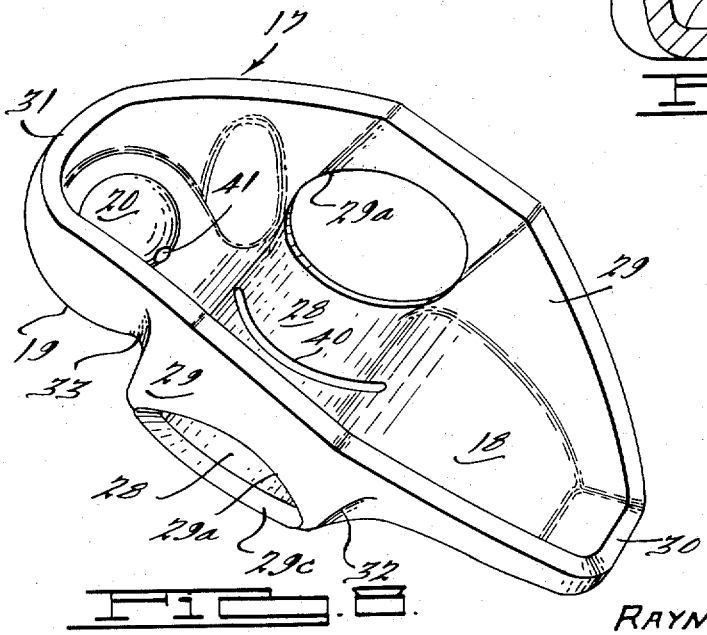
Figure 8 is a perspective view of the rocker arm as seen from above and one side.

A significant structure of the present invention illustrated in Figures 3–6 and 8 comprises the portions of the sides 29 adjacent their junctures with the strap 28 which are coined or creased inwardly at 32 and 33 to provide axially spaced upward extensions 34 and 35 of the cylindrical strap 28 at opposite sides of the shaft 16. As illustrated in Figure 6, the cylindrical bearing surface of strap 28 which engages shaft 16 is formed to extend upwardly around the left end of shaft 16 as viewed in Figure 3, substantially to the shading line 36, and thereafter merges with the push rod engaging projection 19. Shading line 36 extends substantially horizontally and axially at its mid region, then curves upwardly at its axial opposite ends to form extensions 35.

Figure 3:
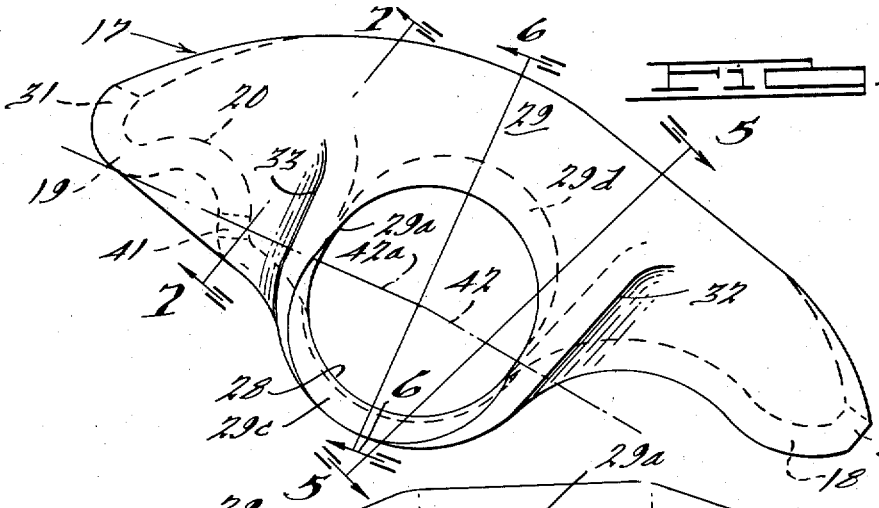
Figure 3 is a side elevational view of the rocker arm removed from the engine.

Similarly, but less pronounced, as illustrated in Figure 5, the cylindrical bearing surface of strap 28 which engages shaft 16 is formed to extend around the right end of shaft 16 as viewed in Figure 3, substantially to the shading line 37 and merges with the valve engaging projection 18. Shading line 37 extends substantially horizontally and axially at its mid region, then curves upwardly at its axially opposite ends to form the extensions 34. By the foregoing structure, the bearing surface for shaft 16 is increased and in cooperation with the juxtaposed projections 18 and 19, oil retaining pockets are formed adjacent the shaft 16.

As illustrated in Figures 2 and 3, the coined portions 33 at the axial edges of the cylindrical strap 28 extend upward concentrically with the shaft 16 to the level of a radial line 42a located appreciably above the central portion of the bottom strap 28 which merges leftward with the push rod engaging projection 19. In consequence, an oil retaining pocket 38 is formed in the region below line 42a between shaft 16, the sides and bottom of projection 19, and the coined projections 33.

Lubricating oil is pumped under pressure into hollow shaft 16 and is discharged via a radial port 39 to the inner bearing surface of strap 28 and thence to pocket 38 by means of an oil groove 40 formed in the central portion of strap 28. Above the extensions 35 of the cylindrical bearing surface of strap 28, excess oil will readily flow axially outwardly from the dished rocker arm 17 through clearance 29b, thereby to assure that a continuous flow of fresh cooling lubricant will properly oil the bearing surfaces between the shaft 16 and strap 28 and will flush particles of wear therefrom to be trapped by a suitable filter system. Extending from the region of pocket 38 through the bottom of projection 19 is a lubricating port 41 which supplies oil by leakage to the under side of dimple or socket 20, thence by capillary action to the upper rounded end of push rod 21.

A pocket structure similar to the pocket 38 at the left of shaft 16 is illustrated in Figures 2 and 5 at the right of shaft 16. In this instance, the coined portions 32 at the axial edges of the cylindrical strap 28 extend upward concentrically with shaft 16 to the level of radial line 42 located slightly above the central portion of the strap 28 which merges to the right with the valve engaging projection 18. In consequence, a pocket 43 is formed below the line 42 between the shaft 16, sides and bottom of projection 18, and the coined portions 32. It is apparent that the pockets 38 and 43 maintain the level of lubricating oil above the upper surfaces of the cylindrical strap 28 engaged with shaft 16. Pocket 43 is provided in part to enable a rounded merger of optimum radius of curvature between the right end of the central portion of strap 28 and projection 18, thereby to insure increased structural rigidity for the rocker arm body while at the same time to prevent axial endwise loss of lubricating fluid at regions substantially below the projection 18. In regard to both extensions 34 and 35, it is to be noted that the crescent clearance 29b has its smallest dimension adjacent the upper ends of these extensions. Accordingly substantial axial flow of lubricating fluid from the rocker arm 17 does not take place except at locations somewhat above the lines 42 and 42a. In consequence, the level of the lubricating fluid readily builds up over the crest of the base of the declined projection 18 and end wall 30.

In accordance with the foregoing, a bearing surface of comparatively broad axial width is achieved with a minimum of circumferential extension. The portions of the side walls 29 bridging the openings 29a, in cooperation with the end walls 30 and 31, achieve a particularly rigid rocker arm with a minimum of material and weight. The axially spaced coined portions 32 and 33 at opposite sides of the shaft 16 and closely conforming to the latter, serve both as additional bearing surfaces and as means to block axial oil flow from the rocker arm 17 until a predetermined desired oil level is obtained.

Summarizing the operation of the structure described, oil is pumped under pressure through hollow shaft 16 and thence via port 39 to the bearing surface of strap 28. Circumferentially extending oil passage or oil groove 40 carries oil to the pockets 38 and 43. From pocket 38, the oil flows via port 41 to the under side of socket 20 to lubricate the connection with push rod 21. From pocket 43, aided by the declination of projection 18 and the mechanical agitation of the rapidly oscillating rocker arm 17 during operation, oil flows over the comparatively shallow end wall 30 and around the under side of projection 18 to lubricate the latter's region of engagement with the stem of valve 14.

I claim:

1. A rocker arm adapted to be pivotally mounted on a cylindrical supporting shaft, said rocker arm having a cylindrically shaped bottom strap adapted to conform to the lower portion of the cylindrical contour of said shaft and to engage the same in bearing relation, said strap terminating upwardly at opposite ends in lateral valve stem engaging and push rod engaging projections respectively, each projection having axially spaced sides extending upwardly and joining to bridge the space above said shaft at opposite sides of said strap, said strap at its axially opposite sides adjacent its juncture with said push rod engaging projection having upward extensions conforming closely to the contour of said shaft to restrict the flow of lubricating fluid axially therealong at the regions of said extensions, the latter merging with the axially spaced sides respectively of said push rod engaging projection and cooperating therewith to provide a pocket for said fluid.

2. A rocker arm adapted to be pivotally mounted on a cylindrical supporting shaft, said rocker arm having a cylindrically shaped bottom strap adapted to conform to the lower portion of the cylindrical contour of said shaft and to engage the same in bearing relation, said strap terminating upwardly at opposite ends in lateral rod engaging projections, each projection having axially spaced sides extending upwardly and joining to bridge the space above said shaft at opposite sides of said strap, said strap at its axially opposite sides adjacent its juncture with one of said projections having upward extensions conforming closely to the contour of said shaft to restrict the flow of lubricating fluid axially therealong at the regions of said extensions, the latter merging with the axially spaced sides respectively of said one projection and cooperating therewith to provide a pocket for said fluid, said one projection being engageable at its under side with *a* rod and having an orifice extending therethrough from the region of said pocket to said under side for passage of said fluid.

3. A rocker arm adapted to be pivotally mounted on a cylindrical supporting shaft, said rocker arm having a cylindrically shaped bottom strap adapted to conform to the lower portion of the cylindrical contour of said shaft and to engage the same in bearing relation, said strap terminating upwardly at opposite ends in lateral valve stem engaging and push rod engaging projections respectively, each projection having axially spaced sides extending upwardly and joining to bridge the space above said shaft at opposite sides of said strap, said strap at its axially opposite sides adjacent its juncture with said push rod engaging projection having upward extensions conforming closely to the contour of said shaft to restrict the flow of lubricating fluid axially therealong at the regions of said extensions, the latter merging with the axially spaced sides respectively of said push rod engaging projection and cooperating therewith to provide a pocket for said fluid, said push rod engaging projection having a dimple in its under side adapted to receive an end of a push rod and also having an orifice extending therethrough from the region of said pocket to said under side at said dimple for passage of said fluid.

4. A rocker arm adapted to be pivotally mounted on a cylindrical supporting shaft, said rocker arm having a cylindrically shaped bottom strap adapted to conform to the lower portion of the cylindrical contour of said shaft and to engage the same in bearing relation, said strap terminating upwardly at opposite ends in lateral valve stem engaging and push rod engaging projections respectively, each projection having axially spaced sides extending upwardly and joining to bridge the space above said shaft at opposite sides of said strap, and an oil passage groove extending circumferentially within the cylindrical surface of said strap to confront said shaft and receive lubricating fluid therefrom.

5. A rocker arm adapted to be pivotally mounted on a cylindrical supporting shaft, said rocker arm having a cylindrically shaped bottom strap adapted to conform to the lower portion of the cylindrical contour of said shaft and to engage the same in bearing relation, said strap terminating upwardly at opposite ends in lateral valve stem engaging and push rod engaging projections respectively, each projection having axially spaced sides extending upwardly and joining to bridge the space above said shaft at opposite sides of said shaft, the region of said rocker arm at the juncture of said strap with at least one of said projections at axially opposite sides of the strap conforming closely to the cylindrical contour of said shaft to comprise upward extensions of said strap, said upward extensions restricting the flow of lubricating fluid axially from said rocker arm between the latter and shaft at regions below said upward extensions, and an oil passage groove extending circumferentially within the cylindrical surface of said strap to confront said shaft and receive lubricating fluid therefrom.

6. A rocker arm adapted to be pivotally mounted on a cylindrical supporting shaft, said rocker arm having a cylindrically shaped bottom strap adapted to conform to the lower portion of the cylindrical contour of said shaft and to engage the same in bearing relation, said strap terminating upwardly at opposite ends in lateral valve stem engaging and push rod engaging projections respectively, each projection having axially spaced sides extending upwardly and joining to bridge the space above said shaft at opposite sides of said shaft, said strap at its axially opposite sides adjacent its [junction] *juncture* with said push rod engaging projection having upward extensions conforming closely to the contour of said shaft to restrict the flow of lubricating fluid axially therealong at the regions of said extensions, the latter merging with the axially spaced sides respectively of said push rod engaging projection and cooperating therewith to provide a pocket for said fluid, said push rod engaging projection having a dimple in its under side adapted to receive an end of a push rod and also having an orifice extending therethrough from the region of said pocket to said under side at said dimple for passage of said fluid, and an oil passage groove extending circumferentially within the cylindrical surface of said strap to confront said shaft and receive lubricating fluid therefrom.

7. A rocker arm adapted to be pivotally mounted on a cylindrical supporting shaft, said rocker arm having a cylindrically shaped bottom strap adapted to conform to the lower portion of the cylindrical contour of said shaft and to engage the same in bearing relation, said strap terminating upwardly at opposite ends in lateral valve stem engaging and push rod engaging projections respectively, each projection having axially spaced sides extending upwardly and joining to bridge the space above said shaft at opposite sides of said shaft, said push rod engaging projection inclining from said strap, said valve engaging projection declining from said strap, and the axial spacing between the sides of at least one of said projections adjacent the latter's juncture with said strap being restricted to provide *upward* [upwardly] extensions of said strap conforming closely to the cylindrical contour of said shaft and restricting the flow of lubricating fluid axially from said rocker arm between the latter and shaft.

8. A rocker arm adapted to be pivotally mounted on a cylindrical supporting shaft, said rocker arm having a cylindrically shaped bottom strap adapted to conform to the lower portion of the cylindrical contour of said shaft and to engage the same in bearing relation, said strap terminating upwardly at opposite ends in lateral valve stem engaging and push rod engaging projections respectively, each projection having upwardly extending end walls and side walls, said side walls merging at opposite sides of said strap and bridging the space above said shaft at said opposite sides, said push rod engaging projection inclining from said strap, said valve engaging projection declining from said strap, and the axial spacing between the sides of at least one of said projections adjacent the latter's juncture with said strap being restricted to provide upward extensions of said strap conforming closely to the cylindrical contour of said shaft and restricting the flow of lubricating fluid axially from said rocker arm between the latter and shaft.

9. A rocker arm adapted to be pivotally mounted on a cylindrical supporting shaft, said rocker arm having a cylindrically shaped bottom strap adapted to conform to the lower portion of the cylindrical contour of said shaft and to engage the same in bearing relation, said strap terminating upwardly at opposite ends in lateral valve stem engaging and push rod engaging projections respectively, each projection having upwardly extending end walls and side walls, said side walls merging at opposite sides of said strap and bridging the space above said shaft at said opposite sides, one of said projections inclining from said strap and the other projection declining from said strap, the axial spacing between the sides of said one projection adjacent the latter's juncture with said strap being restricted to provide upward extensions of said strap conforming closely to the cylindrical contour of said shaft and restricting the flow of lubricating fluid axially from said rocker arm between the latter and shaft and thereby cooperating with said one projection to provide a pocket adjacent said shaft for said fluid, said one projection having a dimple in its under side adapted to receive the end of a shaft and also having an orifice extending therethrough from the region of said pocket to said under side at said dimple for passage of said fluid.

10. A rocker arm adapted to be pivotally mounted on a cylindrical supporting shaft, said rocker arm having a cylindrically shaped bottom strap adapted to conform to the lower portion of the cylindrical contour of said shaft and to engage the same in bearing relation, said strap terminating upwardly at opposite ends in lateral valve stem engaging and push rod engaging projections respectively, each projection having upwardly extending end walls and side walls, said side walls merging at opposite sides of said strap and bridging the space above said shaft at said opposite sides, one of said projections inclining from said strap and the other projection declining from said strap, the axial spacing between the sides of said one projection adjacent the latter's juncture with said strap being restricted to provide upward extensions of said strap conforming closely to the cylindrical contour of said shaft and restricting the flow of lubricating fluid axially from said rocker arm between the latter and shaft and thereby cooperating with said one projection to provide a pocket adjacent said shaft for said fluid, said one projection having a dimple in its under side adapted to receive the end of a shaft and also having an orifice extending therethrough from the region of said pocket to said under side at said dimple for passage of said fluid, and an oil passage groove extending circumferentially within the cylindrical surface of said strap to confront said shaft and receive lubricating fluid therefrom.

11. A rocker arm adapted to be pivotally mounted on a cylindrical supporting shaft, said rocker arm having a cylindrically shaped bottom strap adapted to conform to the lower portion of the cylindrical contour of said shaft and to engage the same in bearing relation, said strap terminating upwardly at opposite ends in lateral valve stem engaging and push rod engaging projections respectively, each projection having upwardly extending end walls and side walls, said side walls merging at opposite sides of said strap and bridging the space above said shaft at said opposite sides, one of said projections inclining from said strap, the axial spacing between the sides of said one projection adjacent the latter's juncture with said strap being restricted to provide upward extensions of said strap conforming closely to the cylindrical contour of said shaft and restricting the flow of lubricating fluid axially from said rocker arm between the latter and shaft and thereby cooperating with said one projection to provide a pocket adjacent said shaft for said fluid, said one projection having a dimple in its under side adapted to receive the end of a shaft and also having an orifice extending therethrough from the region of said pocket to said under side at said dimple for passage of said fluid.

12. A rocker arm adapted to be pivotally mounted on a cylindrical supporting shaft, said rocker arm having a cylindrically shaped bottom strap adapted to conform to the lower portion of the cylindrical contour of said shaft and to engage the same in bearing relation, said strap having an upper end terminating in a lateral rod engaging projection having axially spaced sides extending upwardly, said strap at its axially opposite sides adjacent its juncture with said rod engaging projection having upward extensions conforming closely to the contour of said shaft to restrict the flow of lubricating fluid axially therealong at the regions of said extensions, the latter merging with the axially spaced sides respectively of said rod engaging projection and cooperating therewith to provide a pocket for said fluid.

13. A rocker arm adapted to be pivotally mounted on a cylindrical supporting shaft, said rocker arm having a cylindrically shaped bottom strap adapted to conform to the lower portion of the cylindrical contour of said shaft and to engage the same in bearing relation, said strap terminating upwardly at opposite ends in lateral projections, each projection having upwardly extending side walls merging at opposite sides of said strap and bridging the space above said shaft at said opposite sides, said strap at its axially opposite sides adjacent its juncture with said projections having upward *extensions* [extension] conforming closely to the contour of said shaft to restrict the flow of lubricating fluid axially therealong at the regions of said extensions, the latter merging with the axially spaced sides *respectively* [respectievly] of said projections and cooperating therewith to provide a pocket for said fluid.

14. A rocker arm adapted to be pivotally mounted on a cylindrical supporting shaft, said rocker arm having a cylindrically shaped bottom strap adapted to conform to the lower portion of the cylindrical contour of said shaft and to engage the same in bearing relation, said strap having an upper end terminating in a lateral rod engaging projection having axially spaced sides extending upwardly and bridging the space above said shaft at the opposite sides of said strap and merging at said opposite sides with the other upper end of said strap, said strap at its axially opposite sides adjacent its juncture with said rod engaging projection having upward extensions conforming closely to the contour of said shaft to restrict the flow of lubricating fluid axially therealong at the regions of said extensions, the latter merging with the axially spaced sides respectively of said rod engaging projection and cooperating therewith to provide a pocket for said fluid.

*15. A rocker arm for operating a valve for an internal combustion engine or the like comprising a unitary metal arm formed of a single sheet of metal shaped for rigidity in a rocking plane of operation, means at one end of the arm for operatively connecting to a reciprocable push rod whereby the arm is pivotally rocked about a pivotal point intermediate the ends, means at the other end of the arm for operatively engaging a valve stem whereby the reciprocating movement of the push rod may be translated to a poppet valve, and bearing means formed integral with said single sheet and located at said pivotal point along the arm for mounting the arm on an arm supporting shaft which extends transversely of the arm and transversely of said rocking plane of motion, said bearing means located coaxial with said pivotal point.*

*16. A rocker arm for operating a valve for an internal combustion engine or the like comprising a unitary metal arm formed of a single sheet of metal shaped for rigidity in a rocking plane of operation, means formed from said metal sheet at one end of the arm for operatively connecting to a reciprocable push rod whereby the arm is pivotally rocked about a pivotal point intermediate the ends, means formed from said metal sheet at the other end of the arm for operatively engaging a valve stem whereby the reciprocating movement of the push rod may be translated to a poppet valve, and cylindrical shaped bearing means formed from said single sheet from which the arm is formed located at said pivotal point for pivotally attaching said arm to a pivotal support on an engine permitting pivotal movement in said rocking plane of operation.*

*17. A rocker arm for operating a valve for an internal combustion engine or the like comprising a unitary metal arm formed of a single sheet of metal shaped for rigidity in a rocking plane of operation having a bearing formed intermediate the ends and having a wall projecting upright from the arm, means defining a substantially circular opening in said wall at a location intermediate the ends of the arm and in axial alignment for assembly by sliding over an arm supporting shaft whereby the rocker arm will be held against displacement about an axis perpendicular to the arm and will be supported on the shaft for pivotal rocking movement, means at one end of the arm for operatively connecting to a reciprocable push rod whereby the arm is pivotally rocked about a pivotal point intermediate the ends, and means at the other end of the arm for operatively engaging a valve stem whereby the reciprocating movement of the push rod may be translated to a poppet valve.*

*18. A rocker arm for operating a valve for an internal combustion engine or the like comprising a shaped elongated rocker arm formed substantially in its entirety of pressed metal plate, means at one end of the arm for operatively receiving a reciprocable push rod to rock the arm in a substantially vertical plane when used in an upright position, means at the other end of the arm for operatively receiving the stem of a poppet valve to be operated by the arm with pivotal movement whereby the reciprocating movement of the push rod is translated to the valve, and a metal plate section of substantially uniform thickness formed from said sheet at the center of the rocker arm shaped with a hollow open cylindrical bearing face with its axis laterally of the rocker arm and facing upwardly to fit against the cylindrical lower surface of a shaft for pivotally supporting the rocker arm.*

*19. A rocker arm for operating a valve for an internal combustion engine or the like comprising a shaped elongated rocker arm formed substantially in its entirety of pressed metal plate, means at one end of the arm for operatively receiving a reciprocable push rod to rock the arm in a substantially vertical plane when used in an upright position, means at the other end of the arm for operatively receiving the stem of a poppet valve to be operated by the arm with pivotal movement whereby the reciprocating movement of the push rod is translated to the valve, and a metal plate section of substantially uniform thickness at the center of the rocker arm shaped with a hollow open cylindrical bearing face with its axis laterally of the rocker arm and facing upwardly to fit against the cylindrical lower surface of a shaft for pivotally supporting the rocker arm and having portions at the sides of said bearing face turned upwardly to form side walls for strengthening the arm and having axial openings through each of the side walls larger than the supporting shaft to be slid over the shaft in assembly guiding the rocker arm in its place on the shaft to prevent displacement of said bearing face.*

*20. In a valve in head engine, a valve operating assembly having an upwardly extending reciprocable push rod, a poppet valve with an operating stem having an upwardly exposed end, a laterally extending support shaft located between the push rod and poppet valve, a shaped pressed metal rocker arm formed of a single unitary sheet of metal and extending between said push rod and valve stem and pivotally carried on the support shaft, means at one end of the arm for operatively receiving the reciprocable push rod to rock the arm in a substantially vertical plane when used in an upright position, means at the other end of the arm for operatively receiving the stem of the poppet valve to be operated by the arm with pivotal movement whereby the reciprocating movement of the push rod is translated to the valve, and an upwardly facing cylindrical bearing face intermediate of the ends of the rocket arm pressed into the upper surface of the sheet of metal and carrying the rocker arm on the lower surface of the support shaft.*

*21. In a valve in head engine, a valve operating assembly having an upwardly extending reciprocable push rod, a poppet valve with an operating stem having an upwardly exposed end, a laterally extending support shaft located between the push rod and poppet valve, a shaped pressed metal rocker arm formed of a single unitary sheet of metal and extending between said push rod and valve stem and pivotally carried on the support shaft, means at one end of the arm for operatively receiving the reciprocable push rod to rock the arm in a substantially vertical plane when used in an upright position, means at the other end of the arm for operatively receiving the stem of the poppet valve to be operated by the arm with pivotal movement whereby the reciprocating movement of the push rod is translated to the valve, an upwardly facing cylindrical bearing face intermediate of the ends of the rocker arm pressed into the upper surface of the sheet of metal and carrying the rocker arm on the lower surface of the support shaft, and means reinforcing said bearing face to prevent deformation thereof and strengthen said rocker arm.*

*22. In a valve in head engine, a valve operating assembly having an upwardly extending reciprocable push rod, a poppet valve with an operating stem having an upwardly exposed end, a laterally extending support shaft located between the push rod and poppet valve, a shaped pressed metal rocker arm formed of a single unitary sheet of metal and extending between said push rod and valve stem and pivotally carried on the support shaft, means at one end of the arm for operatively receiving the reciprocable push rod to rock the arm in a substantially vertical plane when used in an upright position, means at the other end of the arm for operatively receiving the stem of the poppet valve to be operated by the arm with pivotal movement whereby the reciprocating movement of the push rod is translated to the valve, an upwardly facing cylindrical bearing face intermediate of the ends of the rocker arm pressed into the upper surface of the sheet*

*of metal and carrying the rocker arm on the lower surface of the support shaft, and side walls formed of said sheet of metal integral with said rocker arm and turned upwardly at the sides of the rocker arm to strengthen the bearing face and rocker arm.*

*23. A rocker arm for an engine having a push rod and a poppet valve comprising a unitary rocker arm formed of a single flat plate of material of substantially uniform thickness, first means formed in the arm at one end for operably receiving a push rod of an engine, second means formed in the arm at the other end of the rocker arm for operably receiving the stem of a valve to be operated by reciprocation of the push rod, said first and second means displaced laterally on opposite sides of an axis of the rocker arm centrally located and extending parallel to the arm and between its ends, and means formed in the arm intermediate the ends and integral with the plate of material for pivotally supporting the arm on a supporting shaft on the engine.*

*24. A rocker arm for an engine having a push rod and a poppet valve comprising a unitary rocker arm formed of a single flat plate of material of substantially uniform thickness, first means formed in the arm at one end for operably receiving a push rod of an engine, second means formed in the arm at the other end of the rocker arm for operably receiving the stem of a valve to be operated by reciprocation of the push rod, said first and second means displaced laterally with respect to the longitudinal axis of the arm, and an open cylindrical shaped bearing face formed in the arm integral with the plate of material intermediate the ends and extending laterally with*

*its axis substantially normal to the axis of the rocker arm and facing upwardly for pivotally bearing on a supporting shaft on the engine.*

*25. A rocker arm for an engine having a push rod and a poppet valve comprising a unitary rocker arm formed of a single flat plate of material of substantially uniform thickness, first means formed in the arm at one end for operably receiving a push rod of an engine, second means formed in the arm at the other end of the rocker arm for operably receiving the stem of a valve to be operated by reciprocation of the push rod, said first and second means displaced laterally on opposite sides of the axis of the rocker arm extending parallel to the arm and between its ends, an open cylindrical shaped bearing face formed in the arm intermediate the ends and extending laterally with its axis substantially normal to the axis of the rocker arm and facing upwardly for pivotally bearing on a supporting shaft on an engine, a vertical wall formed of said plate material and projecting upwardly to reinforce said arm, and a lateral opening through said vertical wall above said bearing face whereby the supporting shaft may be passed through the wall.*

References Cited in the file of this patent or the original patent

UNITED STATES PATENTS

| | | |
|---|---|---|
| 2,338,726 | Leake | Jan. 11, 1944 |
| 2,572,968 | Bachle | Oct. 30, 1951 |
| 2,824,553 | Celli | Feb. 25, 1958 |
| 2,824,555 | Sampietro | Feb. 25, 1958 |